W. K. MENNS.
SPEED INDICATING AND RECORDING MECHANISM.
APPLICATION FILED JAN. 5, 1911.

997,075.

Patented July 4, 1911.

3 SHEETS—SHEET 1.

WITNESSES:
William J. Sperl
H. E. McGraw

INVENTOR:
Walter K. Menns

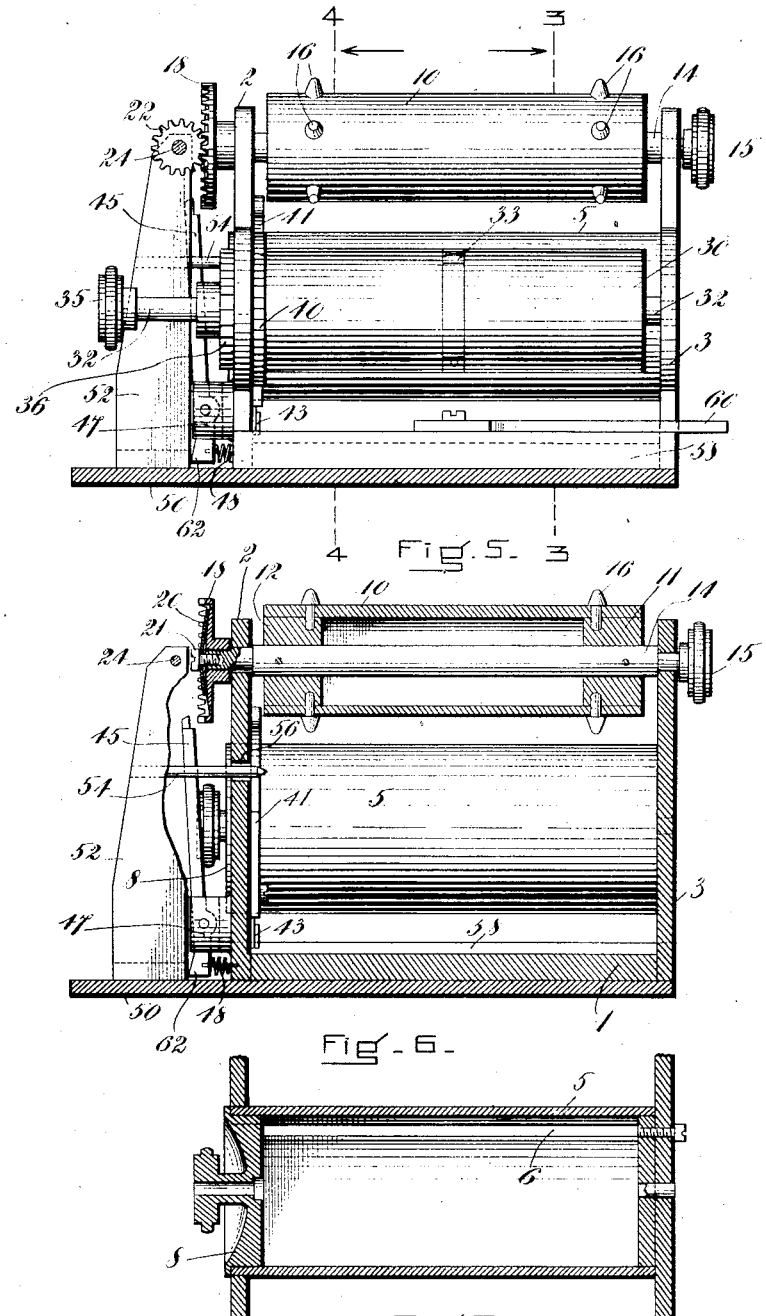

W. K. MENNS.
SPEED INDICATING AND RECORDING MECHANISM.
APPLICATION FILED JAN. 5, 1911.

997,075.

Patented July 4, 1911.

3 SHEETS—SHEET 3.

WITNESSES:
William J. Sperl
W. E. K. Graw

INVENTOR:
Walter K. Menns

UNITED STATES PATENT OFFICE.

WALTER K. MENNS, OF MALDEN, MASSACHUSETTS.

SPEED INDICATING AND RECORDING MECHANISM.

997,075.          Specification of Letters Patent.      Patented July 4, 1911.

Application filed January 5, 1911. Serial No. 600,996.

*To all whom it may concern:*

Be it known that I, WALTER K. MENNS, of Malden, in the county of Middlesex and State of Massachusetts, have invented certain new and useful Improvements in Speed Indicating and Recording Devices, of which the following is a specification.

This invention relates to speed indicating and recording devices, and more particularly to the mechanism by which a web of paper is moved past a marking implement, whereby a record is produced upon the paper.

One object of the invention is to produce a device of the character above described which is adapted for use on motor vehicles, and which shall record the speed and any variations therein during a given interval of time, to produce a record showing exactly at what speed the vehicle has been driven during the entire day.

A further object is to produce a device of this character in which the record sheet can be readily removed and replaced by a new sheet, and which is capable of accurate adjustment so that the record may start at any desired minute.

A further object is to provide a take-up mechanism which is independent of the clock mechanism by which the record receiving web is fed.

With the above objects in view, the invention consists in the speed recording device hereinafter described and claimed, the advantages of which will be obvious to those skilled in the art from the following description.

Figure 1:
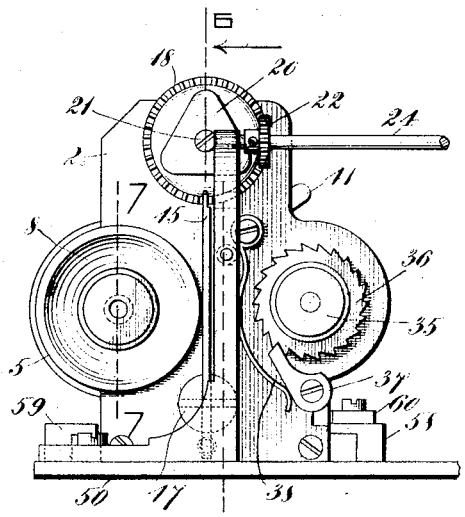
Figure 3:
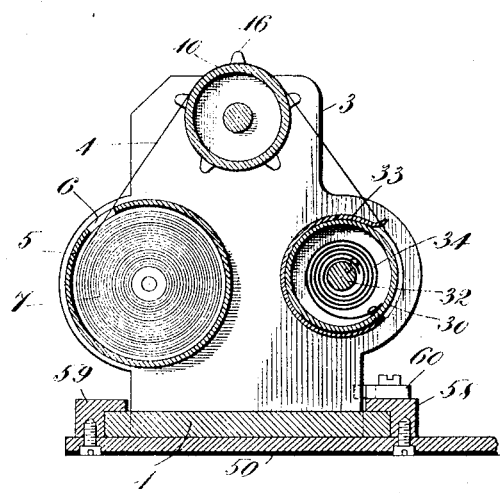
Figure 2:
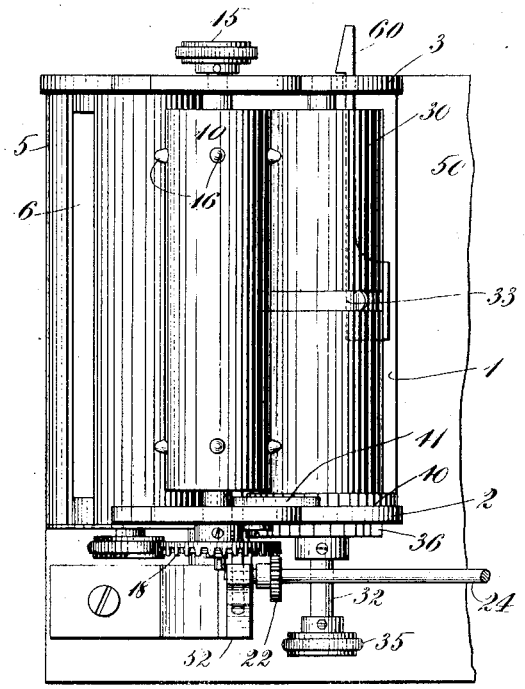
Figure 4:
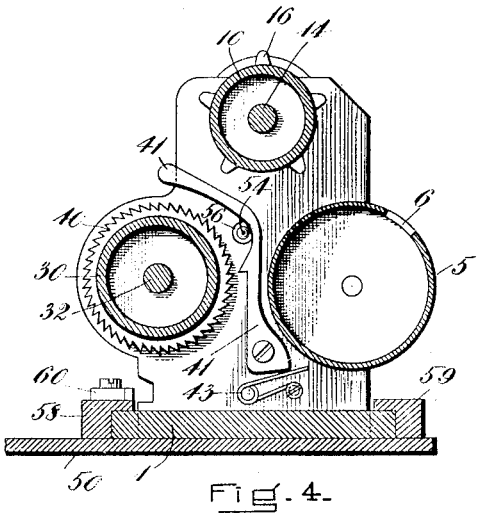
Figure 8:
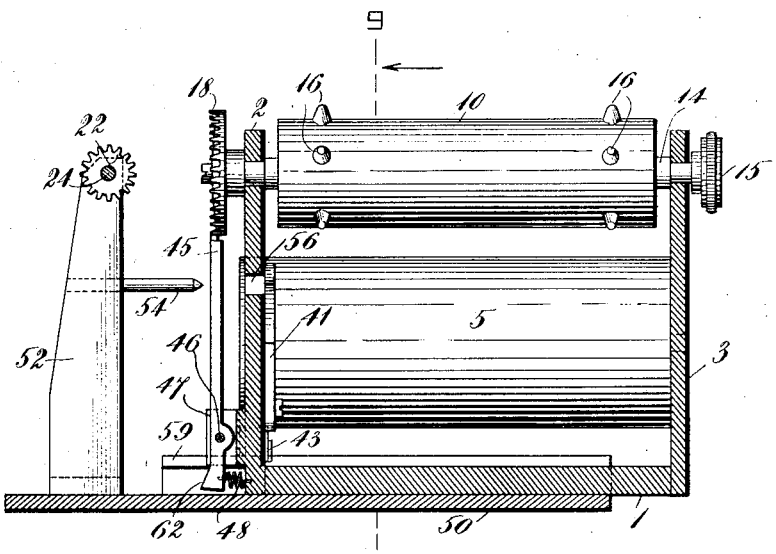
Figure 9:
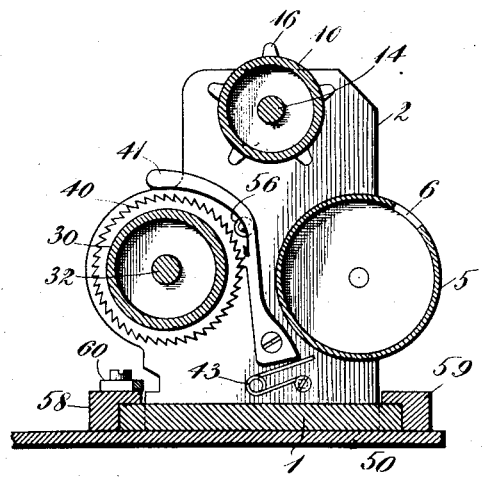
Figure 10:
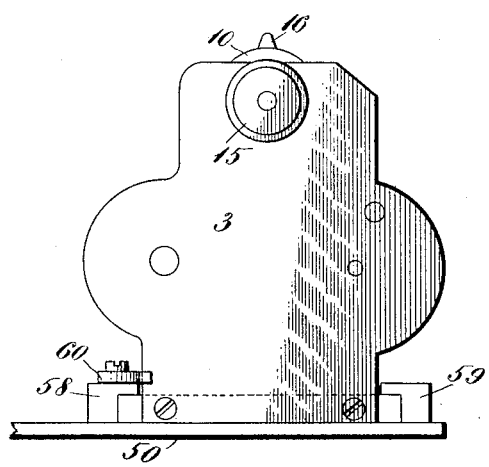

In the accompanying drawings, Figure 1 is an end elevation, as viewed from the bottom of Fig. 2; Fig. 2 is a plan view; Fig. 3 is a transverse, vertical section taken on the line 3—3 in Fig. 5; Fig. 4 is a similar view taken on the line 4—4 in Fig. 5; Fig. 5 is a front elevation; Fig. 6 is a longitudinal, vertical section taken on the line 6—6 in Fig. 1; Fig. 7 is a longitudinal, vertical section taken on the line 7—7 in Fig. 1; Fig. 8 is a sectional elevation showing the recording mechanism in locked position and out of engagement with the time controlled mechanism; Fig. 9 is a transverse, vertical section taken on the line 9—9 in Fig. 8; and Fig. 10 is an end elevation as viewed from the top of Fig. 2.
As illustrated in the drawings, the device comprises a base 1 and two end standards 2 and 3. The web 4, of paper, upon which the record is made, is fed from a magazine which comprises a tube 5, mounted between the standards 2 and 3. The tube 5 is provided with a slot 6, through which the paper passes as it is fed to receive the record. A closure 8 fits one end of the tube 5, and is removable to enable the roll of paper 7 to be inserted and removed from the tube. With this construction it is not necessary to have the paper mounted upon a reel or other rotatable support, but the roll is slipped into the tube and fed therefrom by the time controlled mechanism which will be hereinafter described.

The paper 4 passes from the slotted tube or magazine 5 over a feed sprocket 10. This sprocket comprises a hollow cylinder mounted on collars 11 and 12, which are pinned to a shaft 14 journaled to rotate in standards 2 and 3. A knurled knob 5 is secured to the shaft 14, whereby the sprocket may be turned manually to adjust the web of paper with relation to the marking implement which produces the record. Two series of pins 16 project radially from the cylinder 10 near its edges, and they are adapted to enter corresponding holes formed in the web of paper. In the present instance there are five pins in each series, and the sprocket is intended to complete one revolution each hour, so that the distance between two consecutive pins represents an interval of twelve minutes, although any other intervals may be employed. A driving gear 18 is mounted on the shaft 14 so that it may be turned thereon, but is held in driving relation therewith by a triangular spring 20, which is held against the outer flat face of the gear by a screw 21. By adjusting the screw 21 the frictional engagement of the spring with the gear may be varied as desired. The driving gear 18 meshes with a driving pinion 22 on a shaft 24, which shaft is connected with any suitable clock mechanism.

The record instrument may be of any well known construction, such as a marking implement held by an arm and movable in the arc of a circle, its position from either edge of the web of paper being determined by the speed at which the vehicle is moving. It is common to have the web of paper ruled with arcs of circles corresponding to the arc struck by the recording instrument, and these arcs are separated a minute apart. By having the driving gear held frictionally but in driving relation with its shaft, the shaft 14 and sprocket 10 may be turned independently of the driving gear to allow the paper web to be brought with one of its arc rulings in exact registry with the marking implement. This enables the record to begin at any given minute, and the time consumed in covering any given distance is accurately recorded and readily determined. After the paper leaves the sprocket it passes to a take-up. This comprises a drum or barrel 30, which is rotatably mounted on a shaft 32 journaled to rotate in the standards 2 and 3. A spring hook or tongue 33 is carried by the drum and adapted to enter a hole in the paper web 4 to act as a drive for the paper. A long coiled spring 34 is connected at one end to the interior of the drum 30 and its other end is connected to the shaft 32. A knurled knob 35 is provided at one end of the shaft 32 by which the latter may be rotated to wind up the spring 34. A ratchet wheel 36 is fast on the shaft 32 adjacent to the outer face of the standard 2, and coöperates with a locking pawl 37, which is pressed into engagement with the teeth of the ratchet by a spring 38 mounted on the outer face of said standard. The pawl 37 prevents the shaft 32 from turning under the influence of the wound up spring 34. In order to prevent the rotation of the drum 30 by the spring 34, except when the time controlled feed regulating mechanism is in operation, an annular ratchet 40 is mounted on the drum 30 adjacent to the inner face of the standard 2, and coöperates with a pawl 41 pivoted upon the inner face of said standard. A spring 43, also on said standard, engages the lower end of the pawl 41 and tends to keep the pawl in engagement with the teeth of the ratchet 40.

In order to lock the gear 18, a lever 45 is provided, which is fulcrumed at 46 upon a block 47 projecting from the base of the standard 2. A spring 48 tends normally to keep the upper end of the lever 45 in engagement with the teeth of the gear wheel. When the gear is thus locked the sprocket can still be rotated by overcoming the friction of the triangular spring 20, to adjust the web of paper. The device so far described is removable as a whole from the time controlled mechanism with which it is associated, in order to enable a record to be removed, or replaced, and adjusted; and the take-up is locked so that its spring will not run down during the time that the paper web is being changed.

When the paper web has been adjusted, the device is placed into operative relation with the time controlled mechanism. Any suitable clock mechanism may be employed and mounted upon a base 50. A post 52 is mounted upon this base plate and forms a bearing for one end of the shaft 24, which is adapted to be connected to and driven by the clock mechanism. A pin 54 projects laterally from the post 52 and is adapted to enter a hole 56 in the standard 2, adjacent to the pawl 42, and engaging said pawl to move it out of engagement with the ratchet 40 when the parts are in the position shown in Figs. 1–7. A pair of guides 58 and 59 are provided on the base 50 to engage the sides of the base 1 to allow the latter to be slid along the base 50. A latch 60 is pivotally mounted on the guide 58, and is adapted to hold the feeding mechanism in operative relation with the clock mechanism. After a new web of paper has been adjusted to the sprocket and take-up, the device is pushed into place upon the base 1. The pin 54 enters the hole 56 and swings the pawl 42 from engagement with the ratchet 40, whereupon the take-up is free to operate to keep the web taut and wind it up as fast as it is fed by the sprocket. At the same time a projection 62 on the lower end of the lever 45 is brought into contact with the post 52, and the upper end of said lever is swung out of engagement with the teeth of the gear 18, said gear at this time being meshed with the pinion 22. The sprocket is now in operative relation with the clock mechanism through the shaft 24, and the web of paper can be adjusted so that the marking instrument will register with some line on the paper, as already explained above. The tendency of the take-up, if free to act, would be to wind up the roll of paper immediately, but the movement of the web is regulated by the time-controlled sprocket. Thus a record will be made upon the paper showing how long the vehicle runs or remains standing, and all variations in speed which have taken place during any interval of time. It is to be observed that the invention is also applicable to other uses than that above set forth; wherever it is desirable that the production of the record shall be time-controlled.

While I have illustrated and described a preferred embodiment of the invention, I am aware that many modifications can be made therein by any person skilled in the art without departing from the scope of the invention as expressed in the claims. Therefore I do not wish to be limited to all the details of construction shown and described, but

What I claim is:

1. In a device of the character described, the combination of time-controlled feed regulating mechanism adapted to regulate the feeding of a web of paper, an independent take-up for taking up the web as it is fed by the feed regulating mechanism, means for locking the feed regulating mechanism and the take-up against operation, and means for simultaneously freeing the feed-regulating mechanism and the take-up.

2. In a device of the character described, the combination of a tube provided with a slot and adapted to receive a roll of paper, time-controlled feed regulating means for regulating the drawing of the paper from the tube through the slot, a spring operated take-up for taking up the paper as it is fed by the feed regulating mechanism, and means for locking the feed regulating mechanism and the take-up.

3. In a device of the character described, the combination of a tube provided with a slot and adapted to receive a roll of paper, a feed sprocket for regulating the drawing of the paper through the slot, means for locking the sprocket against rotation, a spring-operated take-up for taking up the paper as it is fed by the sprocket, and means for positively locking the take-up against rotation.

4. In a device of the character described, the combination of a magazine for holding a roll of paper, means for regulating the feeding of the paper, means for locking the feed regulating means to prevent rotation thereof, a take-up, means for locking the take-up against rotation, time-controlled means adapted to coöperate with the feed regulating means, and means arranged to release the feed regulating means and the take-up when the feed regulating means is brought into operative engagement with the time-controlled means.

5. In a device of the character described, the combination of means for holding a supply of paper, a sprocket for feeding the paper, a shaft with which the sprocket is adapted to rotate, a driving gear rotatable on said shaft, means for frictionally connecting the shaft and gear to enable the sprocket to feed the paper, said sprocket being movable manually independently of said gear to enable the paper to be adjusted, and a take-up for winding up the paper as it is fed by the sprocket.

6. In a device of the character described, the combination with a controlling element, of means adapted to coöperate with said controlling element for regulating the feeding of a record-receiving sheet, means for locking the feed regulating means to prevent rotation thereof, a take-up, means for locking the take-up against rotation, and means arranged to release the feed regulating means and the take-up when the feed regulating means is brought into operative relation with the controlling means.

In testimony whereof I have affixed my signature in the presence of two witnesses.

WALTER K. MENNS.

Witnesses:
GEORGE CLARENDON HODGES,
WILLIAM J. SPERL.